United States Patent [19]

Rauth et al.

[11] 4,439,857

[45] Mar. 27, 1984

[54] DIGITAL DATA TRANSMISSION SYSTEM

[75] Inventors: Erich Rauth, Auenwald; Hans-Jürgen Schmack, Allmersbach, both of Fed. Rep. of Germany

[73] Assignee: Licentia Patent-Verwaltungs-GmbH, Frankfurt am Main, Fed. Rep. of Germany

[21] Appl. No.: 324,658

[22] Filed: Nov. 24, 1981

[30] Foreign Application Priority Data

Nov. 27, 1980 [DE] Fed. Rep. of Germany ....... 3044620

[51] Int. Cl.³ ................................................. H04J 3/06
[52] U.S. Cl. .................................... 370/100; 370/116; 455/612
[58] Field of Search ....................... 370/100, 108, 116; 375/113, 118

[56] References Cited

U.S. PATENT DOCUMENTS

| 2,519,083 | 8/1950 | Sutter et al. .......................... 370/100 |
| 3,067,285 | 12/1962 | Turner .................................. 375/113 |
| 4,006,304 | 2/1977 | Sell . |
| 4,008,390 | 2/1977 | Runge . |
| 4,054,747 | 10/1977 | Pachynski, Jr. ...................... 375/118 |
| 4,088,831 | 5/1978 | Butcher et al. . |
| 4,267,590 | 5/1981 | Bosotti ..................................... 370/3 |

FOREIGN PATENT DOCUMENTS

| 2547771 | 11/1976 | Fed. Rep. of Germany . |
| 2656054 | 6/1977 | Fed. Rep. of Germany . |
| 2710875 | 9/1977 | Fed. Rep. of Germany . |
| 2855676 | 7/1980 | Fed. Rep. of Germany . |
| DE/EP 9534 | 10/1980 | Fed. Rep. of Germany . |
| 3015744 | 11/1980 | Fed. Rep. of Germany . |
| 2922418 | 12/1980 | Fed. Rep. of Germany . |

OTHER PUBLICATIONS

Pulse and Digital Circuits, pp. 526 and 527; Millman and Taub, McGraw Hill, 1956.

*Primary Examiner*—Benedict V. Safourek
*Attorney, Agent, or Firm*—Spencer & Frank

[57] ABSTRACT

A digital time multiplex communications system for transmission of a time multiplex signal containing the signal elements of a synchronization channel and of a plurality of communications channels. The receiver includes a member for separating the synchronization channel signal element from the communications channel signal elements of each frame. An externally triggerable sawtooth voltage generator connected to the separating member generates a sawtooth voltage sweep in response to the appearance of each synchronization channel signal element. A plurality of comparison stages each associated with a respective communications channel and connected to receive the sawtooth voltage and to produce an output signal when the sawtooth voltage reaches a respective value which differs by a fixed amount from one stage to the next such that the output signal from each stage occurs at a time corresponding to the appearance of a signal element of its associated communications channel.

3 Claims, 2 Drawing Figures

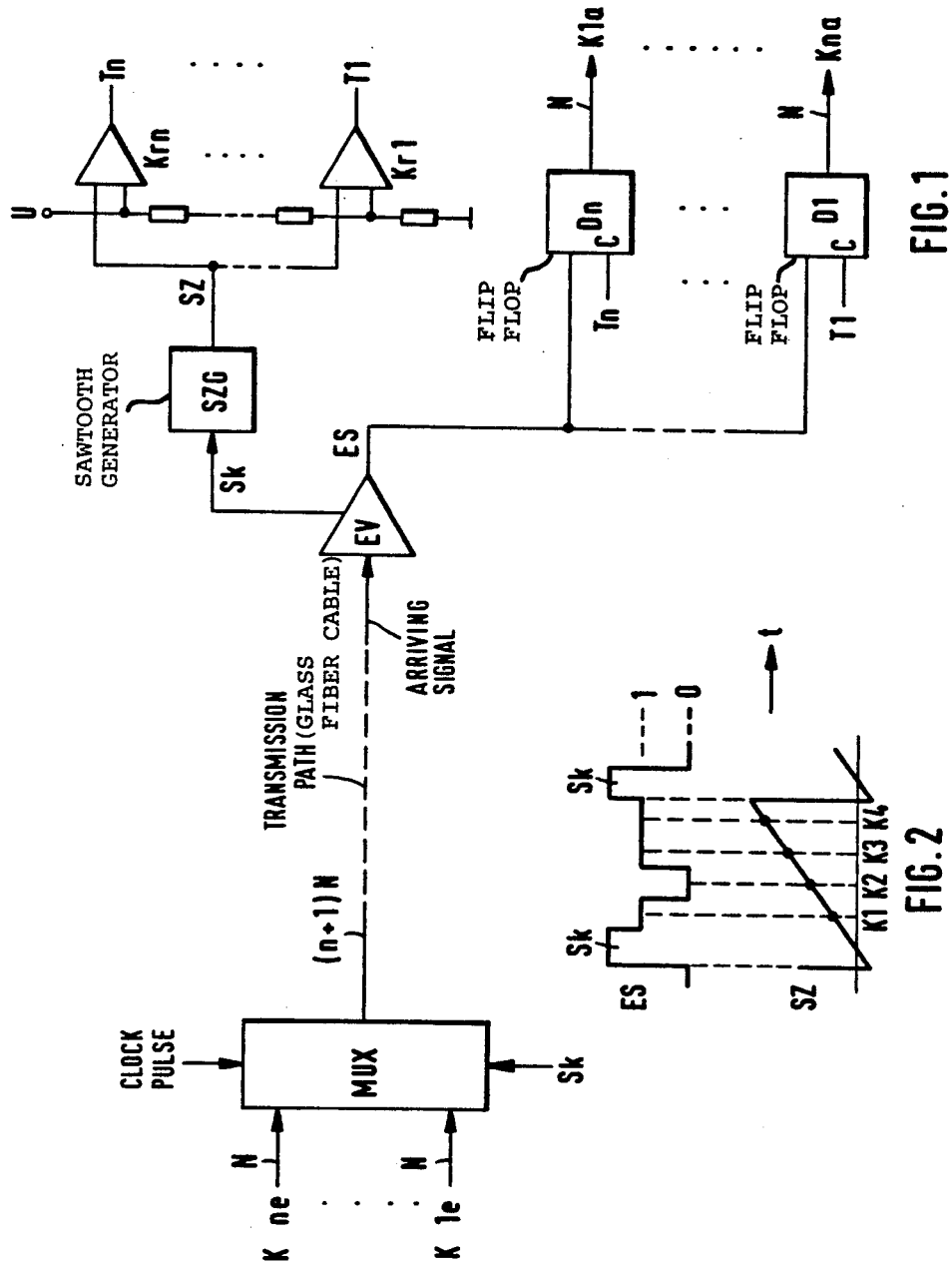

4,439,857

DIGITAL DATA TRANSMISSION SYSTEM

BACKGROUND OF THE INVENTION

The present invention relates to a digital data transmission system of the time mutiple multiplex type.

Such transmission systems are known. One problem encountered in these systems is the synchronization to the individual bits or to the frame, respectively. Typically, the bit clock pulse is recovered with the aid of PLL loops while the frame synchronization is effected with the aid of a constant sync bit or a word composed of a plurality of bits.

This type of synchronization is complicated and therefore expensive.

SUMMARY OF THE INVENTION

It is therefore an object of the present invention to provide a digital data transmission system of the above type in which the frame or bit synchronization is effected in a less complicated manner.

The above and other objects are achieved, according to the invention, in a digital time multiplex communications system including a transmitter, a receiver, and a transmission path for transmission, from the transmitter to the receiver, of a time multiplex signal containing the signal elements of a synchronization channel and of a plurality of communications channels, the signal elements having the same repetition rate in each channel, the signal transmitted by the transmitter being constituted by a succession of time frames and each frame being composed of a succession of equal element intervals each of which contains a signal element of a respective channel, by providing the receiver with means connected to the transmission path for separating the synchronization channel signal element from the communications channel signal elements of each frame and having a synchronization channel output at which appears each separated synchronization channel signal element and a communications channel output at which appear the communications channel signal elements, externally triggerable sawtooth voltage generator means connected to the separating means to generate a sawtooth voltage sweep in response to each synchronization channel signal element appearing at the synchronization channel signal output, voltage amplitude comparison means composed of a plurality of comparison stages each associated with a respective communications channel and connected to receive the sawtooth voltage generated by the generator means, each comparison stage being arranged to produce an output signal when the sawtooth voltage reaches a respective value which differs by a fixed amount from one stage to the next such that the output signal from each stage is produced at a time corresponding to the appearance at the communications channel output of the separating means of a signal element of its associated communications channel, and a plurality of signal storage members each associated with a respective communications channel and each having a data input connected to the communications channel output of the separating means, a clock pulse input connected to receive the output signal produced by the respective comparison stage associated with the same communications channel for causing the storage member to store a representation of the signal element then present at its data input, and an output providing a signal corresponding to its stored representation, such that the output of each storage member provides a signal sequence corresponding to the signal elements of a respective communications channel of the transmitted time multiplex signal.

Data transmission systems acording to the invention are highly suitable for high transmission bit rates and can be manufactured considerably more economically than prior art systems.

BRIEF DESCRIPTION OF THE DRAWING

FIG. 1 is a block circuit diagram of one preferred embodiment of a data transmission system according to the invention.

FIG. 2 is a signal waveform diagram illustrating the operation of the system of FIG. 1.

DESCRIPTION OF THE PREFERRED EMBODIMENTS

The system shown in FIG. 1 includes a transmitting end provided with a time division multiplexer MUX having a plurality of data signal inputs Kle to Kne each connected to a respective one of n communications channels, and one synchronization signal input SK connected to a synchronization signal channel. The signals supplied via each channel have a bit (repetition) rate of N. With the aid of a clock pulse, the incoming data and synchronizing signals are combined into a broadband multiplex signal having the bit rate $(n+1) \times N$, which is fed to the transmission path. The transmission path can be a glass fiber cable of a broad band integrated glass fiber network.

At the receiving end of that path, the arriving signal is amplified in an input amplifier EV whose output signal ES is fed to the data inputs of a plurality of clock pulse controlled flipflops D1 through Dn each associated with a respective communications channel. The receiving amplifier also furnishes a synchronization signal SK. To separate the communications channel signal elements constituting the output signal ES from the synchronization channel signal elements constituting signal SK, amplifier EV is preferably provided with suitable, conventional amplitude threshold switches.

Signal SK is fed to the input of a sawtooth generator SZG producing a sawtooth output voltage SZ which is fed to one input of each of n comparators Kr1 to Krn. Each comparator also has a comparison input which is connected to a respective terminal of a series arrangement of n identical value resistors, which are not individually identified and across which the comparison voltage U is applied.

The resistor chain thus provides a group of comparison voltages differing from one another by equal increments so that during each sawtooth voltage sweep a signal appears at the output of each successive comparator Kr at a constant time interval after appearance of the signal at the output of the immediately adjacent comparator. The value of voltage U and the slope of the sawtooth voltage SZ are selected to assure that output signals appear at the outputs of successive ones of comparators Kr at equally spaced time intervals which correspond to, and occur in coincidence with, the intervals between successive communications signal elements in a frame. Thus, each comparator has an associated discrete comparison voltage corresponding to a respective communications channel. The output of each of the comparators Kr is connected to the clock pulse input T1 to Tn of a respective one of a plurality of D-flipflops D1 through Dn each associated with a respective channel.

The operation of the circuit can be explained in greater detail with reference to FIG. 2, the upper part of which shows the waveform of a broadband multiplex signal ES at the output of amplifier EV. At the start of each frame, this received signal includes a particularly high synchronization pulse SK and thereafter the bit information in n=4 channels. In the lower portion of FIG. 2, the sawtooth voltage SZ is plotted as a function of time. The start of a synchronization pulse triggers the start of a sawtooth voltage sweep. When the sawtooth voltage reaches the threshold of each succeeding comparator, at successive, equispaced time intervals K1, K2, K3 and K4, the respective associated flipflop Dl-Dn is enabled so that the current value of the received signal is stored. At the outputs of the flipflops, there then again appear the input bit streams for the individual channels, each at the bit rate N.

The system according to the invention is of course not limited to two-level, or binary, pulse amplitude or pulse code modulations but can also be used for multi-stage modulations.

A suitable embodiment of separating amplifier EV is described in "Pulse and Ifited circuits" by Millman and Taub, McGraw Hill, 1956, FIG. 17-11 pages 526–527, wherein the received video signals, the sync signal and the signal for the kinescope are corresponding to the arriving signal, the synchronization signal SK and the output signal ES in the inventional system, respectively.

It will be understood that the above description of the present invention is susceptible to various modifications, changes and adaptations, and the same are intended to be comprehended within the meaning and range of equivalents of the appended claims.

What is claimed is:

1. In a digital time multiplex communications system including a transmitter and receiver connected together via a transmission path for transmission of a time multiplex signal containing the signal elements of a synchronization channel and of a plurality of communications channels, the signal elements having the same repetition rate in each channel, the signal transmitted by the transmitter being constituted by a succession of time frames and each frame being composed of a succession of equal element intervals each of which contains a signal element of a respective channel, which system includes, in the receiver:

means connected to the transmission path for separating the synchronization channel signal element from the communications channel signal elements of each from and having a synchronization channel output at which appears each separated synchronization channel signal element and a communications channel output at which appear the communications channel signal elements;

externally triggerable sawtooth voltage generator means connected to said separating means to generate a sawtooth voltage sweep in response to each synchronization channel signal element appearing at said synchronization channel signal output; and voltage amplitude comparison means composed of a plurality of comparison stages each associated with a respective communications channel and connected to receive the sawtooth voltage generated by said generator means, each said comparison stage being arranged to produce an output signal when the sawtooth voltage reaches a respective value which differs by a fixed amount from one stage to the next such that the output signal from each said stage is produced at a time corresponding to the appearance at said communications channel output of said separating means of a signal element of its associated communications channel, the improvement wherein:

the signal elements of each communications channel are binary coded signal elements;

each synchronization channel signal element is a synchronization pulse with a higher amplitude than each communications channel signal element;

said separating means comprise amplitude threshold switch means connected for separating the synchronization channel signal element from the communications channel signal element of each frame; and said system further comprises, in the receiver, a plurality of data flipflops each associated with a respective communications channel and each having a data input connected to said communications channel output of said separating means, a clock pulse input connected to receive the output signal produced by the respective comparison stage associated with the same communications channel for causing said flipflop to store a representation of the signal element then present at its said data input, and an output providing a signal corresponding to its stored representation, such that said output of each said flipflop provides a signal sequence corresponding to the signal elements of a respective communications channel of the transmitted time multiplex signal.

2. Digital communications system as defined in claim 1 wherein said separating means further comprise means connected tor amplifying the time multiplex signal and in which said amplitude threshold switch means are incorporated.

3. Digital communications system as defined in claim 1 connected in a broadband integrated glass fiber network in which said transmission path comprises a glass fiber cable.

* * * * *